No. 875,690. PATENTED JAN. 7, 1908.
C. C. BUTCHER.
CHECK ROW PLANTER.
APPLICATION FILED JULY 3, 1907.
3 SHEETS—SHEET 1.
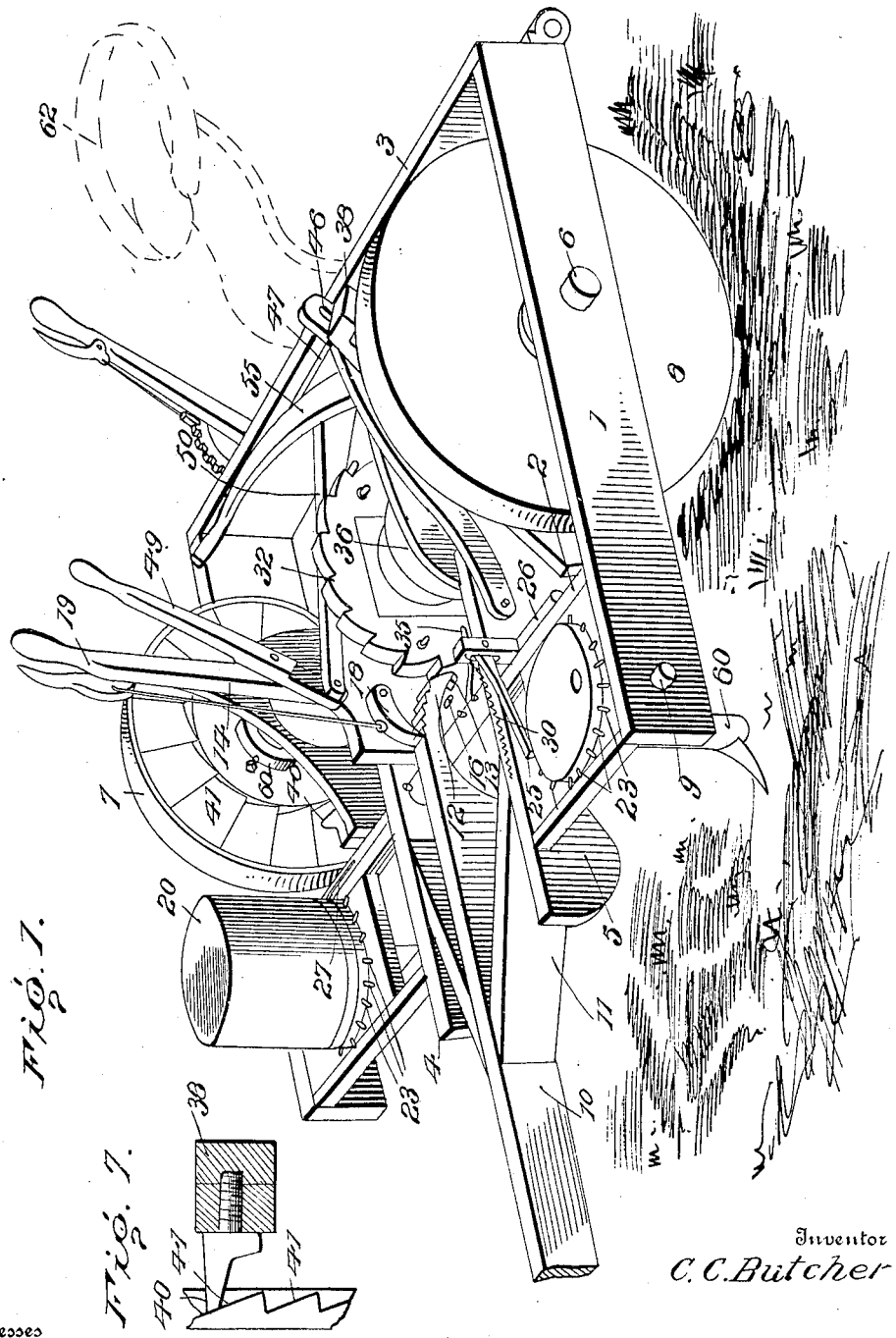
Witnesses
A. T. Measer
W. N. Woodson
Inventor
C. C. Butcher
By R. & A. B. Lacey, Attorneys No. 875,690. PATENTED JAN. 7, 1908.
C. C. BUTCHER.
CHECK ROW PLANTER.
APPLICATION FILED JULY 3, 1907.
3 SHEETS—SHEET 2.
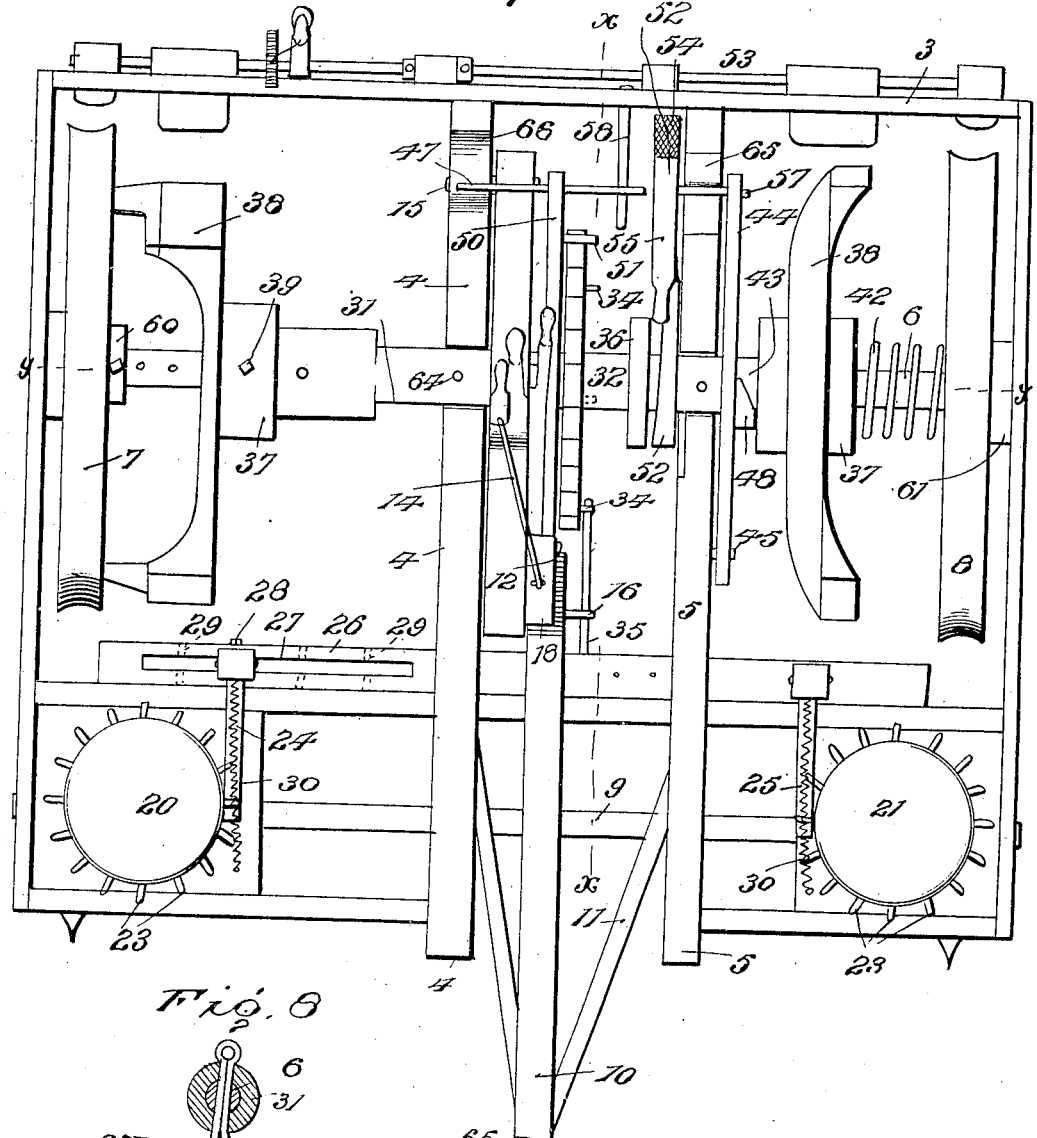
Witnesses
A. T. Measer
W. T. Woodson
Inventor
C. C. Butcher
By
Attorneys

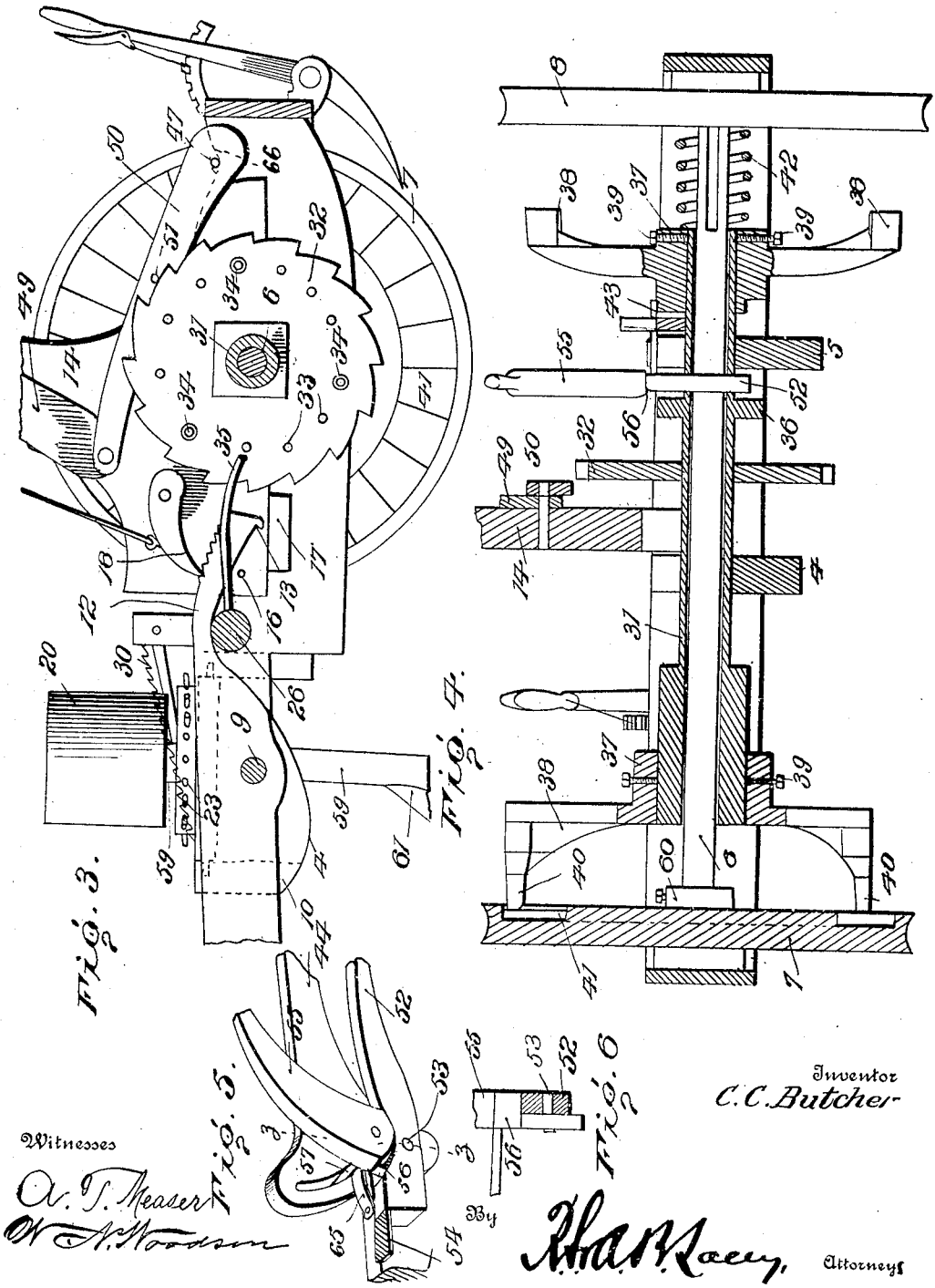

UNITED STATES PATENT OFFICE.

CHRISTOPHER C. BUTCHER, OF URBANA, MISSOURI, ASSIGNOR OF ONE-THIRD TO EDWARD L. RUSSELL, OF URBANA, MISSOURI.

CHECK-ROW PLANTER.

No. 875,690.   Specification of Letters Patent.   Patented Jan. 7, 1908.

Application filed July 3, 1907. Serial No. 382,085.

*To all whom it may concern:*

Be it known that I, CHRISTOPHER C. BUTCHER, citizen of the United States, residing at Urbana, in the county of Dallas and State of Missouri, have invented certain new and useful Improvements in Check-Row Planters, of which the following is a specification.

This invention appertains to agricultural machinery designed for dropping seed and has for its object to provide a planter which may sow seed in drills, or drop the same in hills and in check rows and in the latter capacity obviate the necessity for the accustomed check wire or line.

The invention has for its object to devise a machine which may be adjusted to plant seed in rows in required distances apart within certain limits and which will embody novel means for setting the seed dropping mechanism so as to insure the transverse alinement of the rows.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a check row planter embodying the invention. Fig. 2 is a plan view thereof. Fig. 3 is a longitudinal section on the line x-x of Fig. 2. Fig. 4 is a transverse section on the line y-y of Fig. 2. Fig. 5 is a detail perspective view of the several levers adapted to be operated either by hand or foot for throwing the marker and seed dropper actuating mechanism into and out of gear. Fig. 6 is a vertical section on the line z—z of Fig. 5. Fig. 7 is a detail view of a portion of the ground wheel from which power is taken for operating the working parts and showing a marker arm in section and the tappet projection coöperating with the ratchet and teeth of said ground wheel. Fig. 8 is a transverse section of the axle and the tube mounted thereon, showing the two connected by means of a cotter pin for simultaneous rotation. Fig. 9 is a detail view of a portion of the main frame, showing the pin extended from the foot lever and the spring coöperating therewith to hold the same in either of its extreme positions.

Corresponding and like parts are referred to in the following description and indicated in all the views of the drawings by the same reference characters.

The frame of the machine may be of any construction depending upon the style and finish of the implement and according to the parts to be supported, and comprises longitudinal bars 1, transverse bars 2 and 3 and intermediate longitudinal bars 4 and 5. The axle 6 is mounted in bearings fitted to the longitudinal bars 1 and is provided with ground wheels 7 and 8, the former being loose upon the axle and the latter fast thereto. A rod or bar 9 is arranged transversely of the machine and passes through the front end of the longitudinal bars 1, 4 and 5 and supports the pole or tongue 10, which is strengthened by means of a brace 11. The pole or tongue 10 has a rear extension 12 which is curved and toothed upon its upper side and is formed upon its underside at the rear with a stop 13. A lever 14 is provided at its lower end with front and rear extensions, the latter being pivotally connected to the longitudinal bar 4 at 15 and the front extension having a lateral pin or stud 16 to engage under the rear extension 12 of the pole or tongue and hold the front end of the planter frame at the required adjusted position. The stop 13 of the rear extension 12 is adapted to engage with the pin or stud 16 and prevent axial disengagement of the parts. A stop 17 projected laterally from the intermediate longitudinal bar 4 is adapted to engage the front extension of the lever 14 and support the front portion of the frame at a given elevation. A dog 18 pivoted to the front extension of the lever 14 is adapted to engage with the teeth of the rear extension 12 of the pole and hold the parts in the required adjusted position, that is, with the portion of the frame at the desired elevation. A hand lever 19 pivoted to the upper portion of the lever 14 is connected with the dog 18 to effect release of the same from the toothed portion of the rear extension 12 when adjusting the parts.

The hoppers 20 and 21 for receiving the seed to be deposited may be of any construction and provided with usual seed dropping mechanism. The left hand hopper 21 is stationary whereas the right hand hopper 20 is adjustable laterally to provide for varying the distance between the rows of seed. The seed dropping plates are mounted to turn about a vertical axis and are provided with pins 23 which are engaged by pawls 24 and 25 attached to a rock shaft 26. The pawl 25 is pivoted to a fixed arm, whereas the pawl 24 is carried by an arm adjustable on the rock shaft 26 to adapt it to the position of the hopper 20. Any means may be adopted to provide for adjustment and securance of the arm carrying the pawl 24 in an adjusted position. As shown, the rock shaft 26 has a longitudinal slot 27 in which the arm carrying the pawl 24 is adjustable and secured by means of a pin 28 adapted to pass through one of a series of openings 29 formed in the slotted portion of the rock shaft 26. The rock shaft is thrown forward by means of a spring 30 and is moved rearward by a tappet mechanism presently to be described.

A tube 31 is sleeved upon the axle 6 and is loose thereon to have free longitudinal and rotary movement. A ratchet wheel 32 is either formed with or fitted to the tube 31 and is provided in a side with a series of threaded openings 33 to receive tappet pins 34 to engage with an arm 35 projected from the rock shaft 26. As the tube 31 rotates the pins 34 successively engage with the arm 35 and in conjunction with the spring 30 effect a rocking of said shaft 26 which in turn actuates the dropping mechanism to effect discharge of the seed from the hoppers in the manner well understood. A collar 36 is formed with or applied to the tube 31 adjacent to the ratchet wheel 32. Markers are applied to end portions of the tube 31 and are of similar construction, each consisting of a hub 37 and arms 38, the latter terminating in heads to indent the surface of the ground and indicate the hills or places where the seed have been deposited. The markers are removably fitted upon the tube 31 to admit of adapting the machine for drilling. The right hand marker is adjustable to adapt it to the lateral adjustment of the right hand hopper. The markers are secured to the tube by means of set screws 39 which are threaded in openings formed in the hubs 37. The number of arms of each marker will depend upon the size and capacity of the machine and the distance apart of the hills. The ratchet wheels 32 will be provided with a tappet pin 34 for each arm of a marker and as illustrated the ratchet wheel is supplied with three tappet pins corresponding with the three arms of each marker. When the planter is adapted for sowing seed in drills and the markers are removed, the ratchet wheel 32 will be supplied with a series of tappet pins which may be disposed as closely together as desired according to the distance apart of the seed to be dropped. Pins or projections 40 project from the arms of the right hand marker to coöperate with ratchet teeth 41 of the ground wheel 7, whereby in the operation of the machine the tube 31 and ground wheel 7 rotates together. The pins or projections 40 incline upon their front sides so as to ride upon the ratchet teeth 41 when the machine is backed, thereby obviating injury to the working parts. The pins or projections 40 are pressed towards the ground wheel 7 by means of a spring 42, which is mounted upon the axle 6 and exerts a pressure upon the end of the tube 31 to force the same towards the ground wheel 7.

For throwing the operating mechanism out of gear, the hub of the left hand marker is provided with teeth 43 which are inclined upon their front sides and square upon their rear faces. The lever 44 pivoted at 45 to the intermediate longitudinal bar 5 has its rear end widened and formed with an inclined slot 46 through which passes a pin or rod 47. A tooth 48 projects laterally from the lever 44 towards the teeth 43 to coöperate therewith and move the tube 31 to the left, thereby throwing the pins or projections 40 of the right hand marker out of the path of the ratchet teeth 41 of the ground wheel 7. The coöperating teeth 48 and 43 are formed with stop shoulders which are adapted to interlock and prevent overthrowing of the teeth after the actuating mechanism has been thrown out of gear.

For adjusting the seed dropping mechanism to insure transverse alinement of the rows, the following means have been devised either for turning the tube 31 forward or permitting the same to turn back as the machine advances. A lever 49 is pivoted to one side of the lever 14 and has an arm 50 pivotally connected to its lower end, said arm 50 extending rearward and provided with the pin or rod 47. A second pin or rod 51 is arranged between the ends of the arm 50 and one end thereof is adapted to engage the teeth of the ratchet wheel 32 so as to move the tube forward should the dropping of the seed lag or fall in the rear of the transverse rows. A lever 52 is pivoted at 53 to the intermediate longitudinal bar 5. Its front portion extends over the axle 6 and is arranged to come between the intermediate longitudinal bar 5 and the collar 36 of the tube 31. The rear end of the lever 52 is provided with a rest 54 to be pressed upon by the foot when it is required to withdraw the front portion of the lever 52 from between the collar 36 and the longitudinal bar 5. The lever 52 is adapted to be operated either by foot or by hand and for the latter purpose a lever 55 is mounted upon the pivot 53 and has a shoulder 56 to extend over the said lever 52 and engage therewith and effect positive movement of the lever 52 in either direction, while at the same time admitting of the two levers 52 and 55 having a limited play which is essential to provide for operating the lever 52 by pressure of the foot when it is not desired to move the lever 55. A pin 47 projects laterally from the lever 55 and is adapted to be engaged by an arm 58 projected forward from the rear transverse bar 3.

The ground wheels 7 and 8 are arranged to track with the seed tubes 59 and their treads are made broad and hollow so as to act as coverers and compressors for the earth. The right hand ground wheel 7 is adjustable upon the axle 6 to adapt its position to the right hand hopper and is held in the adjusted position by means of a set collar 60 mounted upon the axle 6. The trenches for receiving the seed are formed by openers 61 which may be of any construction and arrangement common in planters. For convenience of the operator, a seat 62 is provided at the rear of the machine, thereby enabling the weight of the operator or driver to be utilized for counterbalancing the machine upon the axle.

When using the machine for drilling, the markers 38 are removed from the tube 31 and the latter is secured to the axle 6 to rotate therewith, as by means of a cotter pin 63, as indicated most clearly in Fig. 8. For lubricating the tube 31 oil holes 64 are provided therein to admit of introduction of oil from the nozzle of a can or like device. To hold the lever 55 in the adjusted position, the pin 57 extends across the bar 5 and is adapted to be engaged by means of a spring 65 secured to the upper edge of said bar 5, the pin 57 riding over said spring and engaging with one or the other end to hold the lever 55 in the re-required position. The pin 47 carried by the arm 50 has an end portion extended over the longitudinal bar 4 and its opposite end projected over the arm 58. A cam portion 66 formed in the upper edge of the rear portion of the bar 4 to conform to the outline of the arm 58, and the parts 66 and 58 engage with and support the pin 47 and the arm 50, thereby preventing the pin 51 from engaging with the teeth of the ratchet wheel 33, thereby permitting the latter to turn backward.

Having thus described the invention, what is claimed as new is:

1. In a planter the combination of seed dropping mechanism including a ratchet wheel, a marker for indicating the hills and rotatable with the said ratchet wheel, a lever 50 having pin 51 adapted to coöperate with the teeth of the aforementioned ratchet wheel, a pin 47 carried by said lever 50 and projecting from opposite sides thereof, and means for supporting opposite ends of the pin 47 to prevent the end of the lever 50 carrying the pin 51 from dropping when the said lever 50 is moved to throw the pin 51 clear of the teeth of the ratchet wheel.

2. In a planter, the combination of a seed dropping mechanism, a ground wheel, a tube having an independent rotary and longitudinal movement, a ratchet mechanism between said ground wheel and tube, connecting means between the tube and seed dropping mechanism, an operating lever, and coöperating wedge shaped teeth between the said lever and tube to throw the latter out of action.

3. In a planter, the combination of a seed dropping mechanism, a ground wheel, a tube having an independent rotary and longitudinal movement, a ratchet mechanism between said ground wheel and tube, connecting means between the tube and seed dropping mechanism, an operating lever, and coöperating wedge shaped teeth between the said lever and tube to throw the latter out of action, said wedge shaped teeth provided with interlocking stop shoulders to prevent overthrowing of the teeth when the tube is thrown out of gear.

4. In a planter, the combination of seed dropping mechanism, a ground wheel, a rotary driver, a ratchet connection between said rotary driver and ground wheel, connecting means between the rotary driver and the seed dropping mechanism, a lever 44, coöperating wedge elements between the lever 44 and rotary driver to throw the latter out of gear, an operating lever 55, and a connection 57 between the levers 55 and 44.

5. In a planter, the combination of a seed dropping mechanism, a ground wheel, a rotary driver, a ratchet connection between the rotary driver and ground wheel, a collar 36 forming a part of said rotary driver, a lever 52, a lever 55 pivoted to the lever 52 and having a limited play to admit of independent movement of the levers 55 and 52 within certain limits, a lever 44, connecting means between the levers 55 and 44, and means carried by the levers 44 to throw the said rotary driver out of gear.

6. In combination, a seed dropping mechanism, a ground wheel, a rotary driver adapted to operate the seed dropping mechanism, a ratchet connection between the rotary driver and ground wheel, a ratchet wheel 33 fast to the rotary driver, an arm 50 having a lateral extension to engage with the teeth of the ratchet wheel 33, a stop 47 projected laterally from the arm 50, means coöperating with said stop to support the arm 50, and actuating means for the arm 50.

In testimony whereof I affix my signature in presence of two witnesses.

CHRISTOPHER C. BUTCHER. [L. S.]

Witnesses:
 JUDSON MAHAFFEY,
 JOHN E. SHOEMAKER.